United States Patent
Lysaght et al.

(10) Patent No.: US 10,642,765 B1
(45) Date of Patent: May 5, 2020

(54) PRODUCTIVITY LANGUAGE INTERFACE FOR SYNTHESIZED CIRCUITS

(71) Applicant: Xilinx, Inc., San Jose, CA (US)

(72) Inventors: Patrick Lysaght, Los Gatos, CA (US); Graham F. Schelle, Longmont, CA (US); Peter K. Ogden, Dublin (IE)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/183,574

(22) Filed: Nov. 7, 2018

(51) Int. Cl.
*G06F 13/24* (2006.01)
*G06F 13/16* (2006.01)
*G06F 9/50* (2006.01)
*G06F 15/177* (2006.01)
*G06F 3/06* (2006.01)

(52) U.S. Cl.
CPC .......... *G06F 13/24* (2013.01); *G06F 13/1668* (2013.01); *G06F 3/0613* (2013.01); *G06F 9/5016* (2013.01); *G06F 15/177* (2013.01)

(58) Field of Classification Search
CPC ........ G06F 1/3203; G06F 3/0613; G06F 8/61; G06F 13/102; G06F 9/5016; G06F 15/177
See application file for complete search history.

(56) References Cited

U.S. PATENT DOCUMENTS

| | | | | |
|---|---|---|---|---|
| 5,590,284 | A | * 12/1996 | Crosetto | G06F 15/17368 710/104 |
| 2003/0110339 | A1 | * 6/2003 | Calvignac | G06F 13/4265 710/305 |
| 2010/0174808 | A1 | * 7/2010 | Dabagh | G06F 1/3203 709/221 |
| 2011/0314287 | A1 | * 12/2011 | Escott | H04L 63/061 713/171 |
| 2015/0324180 | A1 | * 11/2015 | Tredoux | G06F 13/102 719/321 |
| 2017/0286170 | A1 | * 10/2017 | De | G06F 3/0613 |

OTHER PUBLICATIONS

Eslami, F. et al., "Enabling Effective FPGA Debug using Overlays: Opportunities and Challenges," In 2nd Int'l. Workshop on Overlay Architectures for FPGAs (OLAF2016), Feb. 21, 2016, 6 pg.
Haenel, V., "2.8. Interfacing with C," [online] Scipy Lecture Notes [retrieved Aug. 11, 2017] retrieved from the Internet: <http://www.scipy-lectures.org/advanced/interfacing_with_c/interfacing_with_c.html>, 31 pg.

(Continued)

*Primary Examiner* — Getente A Yimer
(74) *Attorney, Agent, or Firm* — Kevin T. Cuenot

(57) ABSTRACT

A system includes a hardware offload circuit and a slave processor coupled to the hardware offload circuit. The system also includes a processor coupled to the slave processor and configured to execute productivity language instructions. The processor, in response to executing the productivity language instructions, is configured to generate commands and provide the commands to the slave processor. The slave processor, in executing the commands, is configured to monitor operation of the hardware offload circuit and control operation of the hardware offload circuit.

20 Claims, 7 Drawing Sheets

(56) References Cited

OTHER PUBLICATIONS

Catanzaro, B. et al., "SEJITS: Getting Productivity and Performance with Selective Embedded JIT Specialization," Programming Models for Emerging Architectures, vol. 1, No. 1, Oct. 2009, pp. 1-9.
Capalija, D. et al., "Tile-based Bottom-up Compilatoin of Custom Mesh-of-Functional-Units FPGA Overlays," In IEEE 24th Int'l. Conf. on Field Programmable Logic and Applications (FPL), Sep. 2, 2014, pp. 1-8.
Yamagaki, N. et al., "High-speed regular expression matching engine using multi-character NFA," In IEEE International Conference on Field Programmable Logic and Applications, FPL 2008, Sep. 8, 2008, pp. 131-136.
Fingeroff, M. et al., "High-level synthesis: blue book," Xlibris Corporation, 2010, 286 pg.
Nakahara, H. et al., "A regular expression matching circuit based on a decomposed automaton," In International Symposium on Applied Reconfigurable Computing, Mar. 23, 2011, pp. 16-28.
Maxfield, M., "Tutorial: Linear Feedback Shift Registers (LFSRs)—Part 1," [online] EE Times © 2018 UBM Electronics, An AspenCore company, Dec. 20, 2006 [retrieved Mar. 13, 2018], retrieved from the Internet: <https://www.eetimes.com/document.asp?doc_id=1274550>, 5 pg.
Amazon, "Amazon EC2 F1 Instances," [online] Amazon Web Services, Inc. © 2017 [retrieved Aug. 11, 2017], retrieved from the Internet: <https://aws.amazon.com/ec2/instance-types/f1/>, 14 pg.
"From Regular Expression to NFA to DFA ," [online] SNS Courseware, Compiler design—RE&DFA&NFA, [retrieved Oct. 20, 2017], retrieved from the Internet: <https://tajseer.files.wordpress.com/2014/06/re-nfa-dfa.pdf>, 9 pg.
HackingOff, "Regular Expression to NFA (Non-Deterministic Finite Automata)," [online] HackingOff.com © 2012 [retrieved Mar. 20, 2018], retrieved from the Internet: <http://hackingoff.com/compilers/regular-expression-to-nfa-dfa>, 1 pg.
CyberZHG's Toolbox, "Convert simple regular expressions to deterministic finite automaton Regex => NFA => DFA," [online] CyberZHG's Toolbox [retreived Mar. 20, 2018], retrieved from the Internet: <https://cyberzhg.github.io/toolbox/nfa2dfa>, 2 pg.
Wikipedia, "Deterministic finite automaton," [online] Wikipedia, the free encyclopedia, Nov. 29, 2017, retrieved from the Internet: <https://en.wikipedia.org/wiki/Deterministic_finite_automaton>, 6 pg.
Wikipedia, "Very high-level programming language," [online] Wikipedia, the free encyclopedia, Jun. 25, 2017, retrieved from the Internet: <https://en.wikipedia.org/w/index.php?title=Very_high-level_programming_language&oldid=787427362>, 2 pg.
Wikipedia, "Non-Deterministic finite automaton," [online] Wikipedia, the free encyclopedia, Mar. 3, 2018, retrieved from the Internet: <https://en.wikipedia.org/wiki/Nondeterministic_finite_automaton>, 8 pg.
Xilinx, Inc., Peter Alfke, "Created Uses of Block RAM", WP335 (v1.0), Jun. 4, 2008.
U.S. Appl. No. 15/676,530, Schelle, G.F.. et al., "Hardware Trace ADN Introspection for Productivity Platform Using a System-On-Chip," filed Aug. 14, 2017, 91 pg.
U.S. Appl. No. 15/676,437, Lysaght, P. et al., "Productivity Platform Using System-On-Chip With Programmable Circuitry," filed Aug. 14, 2017, 67 pg.
U.S. Appl. No. 15/676,453, Lysaght, P. et al., "Slave Processor Within a System-On-Chip," filed Aug. 14, 2017, 88 pg.
U.S. Appl. No. 15/949,408, Lysaght, P. et al., "Runtime Generators for Regular Expression Matching and Random Number Generation," filed Apr. 10, 2018, 80 pg.
U.S. Appl. No. 15/943,519, Lysaght, P. et al., "System Design Flow With Runtime Customizable Circuits," filed Apr. 2, 2018, 114 pg.
U.S. Appl. No. 15/850,659, Lysaght, P. et al., "Runtime Adaptive Generator Circuit," filed Dec. 21, 2017, 69 pg.

\* cited by examiner

PRODUCTIVITY LANGUAGE INTERFACE FOR SYNTHESIZED CIRCUITS

TECHNICAL FIELD

This disclosure relates to integrated circuits (ICs) and, more particularly, to a productivity language interface for synthesized circuitry implemented within an IC.

BACKGROUND

An application, e.g., program code, can be synthesized into circuitry that is implemented within an integrated circuit (IC). The resulting circuitry is functionally equivalent to the original application. Instead of executing a compiled version of the application (e.g., an executable binary) using a processor, the application is implemented as circuitry configured to provide the same functionality as the executable binary. The circuitry implementing the application typically provides one or more benefits that are not attainable through execution of the compiled application using a processor. The benefit(s) may be faster operation, reduced power consumption, redundancy, etc. For a device such as a programmable IC, the application is compiled into a circuit design that is implemented within programmable circuitry of the programmable IC, thereby physically implementing the application as hardware within the IC.

SUMMARY

In one or more embodiments, a system includes a hardware offload circuit and a slave processor coupled to the hardware offload circuit. The system also includes a processor coupled to the slave processor and configured to execute productivity language instructions. The processor, in response to executing the productivity language instructions, is configured to generate commands and provide the commands to the slave processor. The slave processor, in executing the commands, is configured to monitor operation of the hardware offload circuit and control operation of the hardware offload circuit.

In one or more embodiments, a method includes generating, by a processor and in response to execution of productivity language instructions, commands, providing the commands to a slave processor, and controlling operation of a hardware offload circuit by the slave processor executing the commands. Execution of selected ones of the commands causes the slave processor to generate controls signals for the hardware offload circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
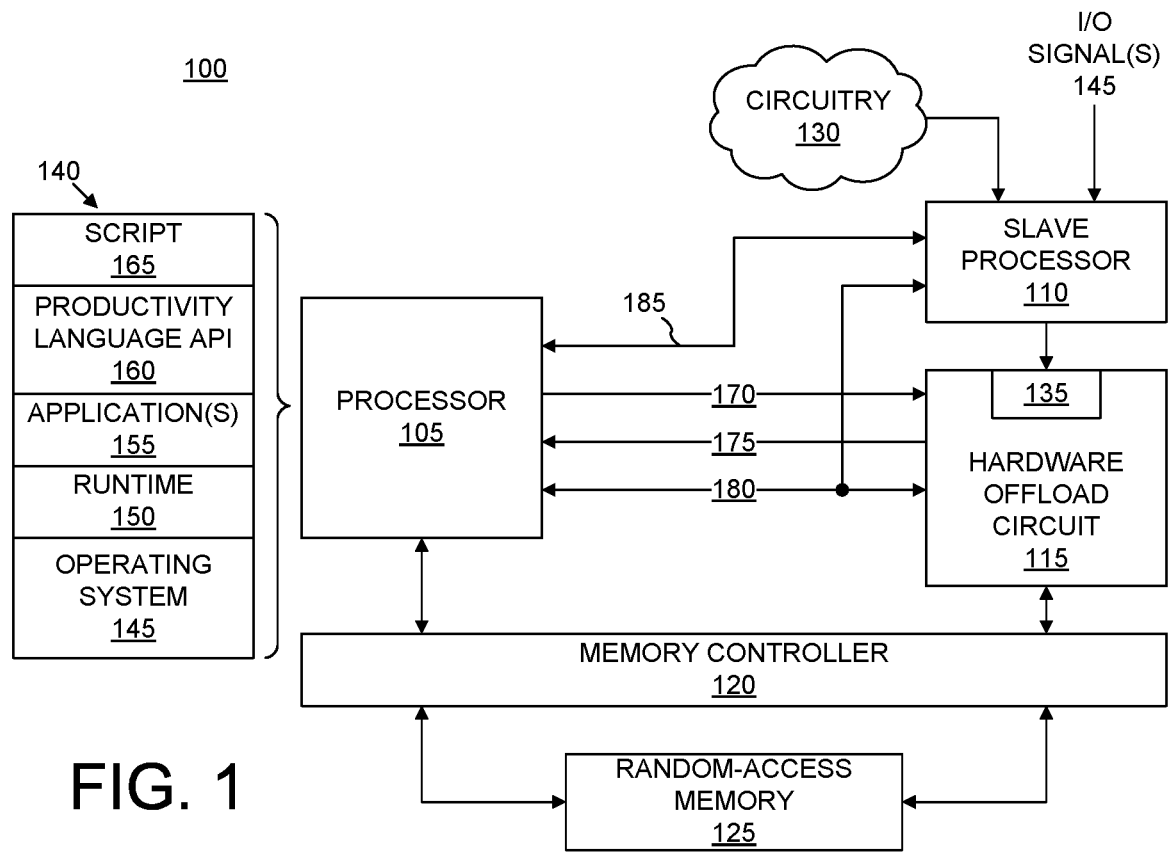
FIG. 1 illustrates an example architecture for hardware offload.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a productivity language interface for synthesized circuitry implemented within an IC. In accordance with the inventive arrangements described within this disclosure, synthesized circuitry can be created from an application (e.g., program code). The synthesized circuitry is controlled through a productivity language application programming interface (API). A processor is capable of executing the productivity language API. Through execution of productivity language instructions that invoke the API, the processor is capable of interacting with the synthesized circuitry also referred to herein as the "hardware offload circuit." The processor, for example, is capable of monitoring the hardware offload circuit, controlling the hardware offload circuit, controlling internal state of the hardware offload circuit, and/or introspecting internal data of the hardware offload circuit using the productivity language API. By providing the productivity language API, applications implemented in hardware (e.g., "hardware offloaded applications") can be integrated with productivity language frameworks and used with a large ecosystem of available open source libraries.

In one or more embodiments, a slave processor is implemented with the hardware offloaded application. The slave processor is coupled to the hardware offload circuit and is capable of monitoring and controlling different aspects of the hardware offload circuit. For example, the slave processor is capable of starting the hardware offload circuit, monitoring operation of the hardware offload circuit, stopping the hardware offload circuit, stepping the clock of the hardware offload circuit, and performing other test and/or debug related operations described herein in greater detail below. The processor executing the productivity language API controls operation of the slave processor and, in doing so, is capable of controlling operation of the hardware offload circuit.

By including a slave processor that is capable of controlling the hardware offload circuit, the hardware offload circuit may be stopped at selected points during operation so that the memory of the hardware offload circuit may be examined (e.g., introspected). Further, by stopping, at least temporarily, the hardware offload circuit, the operating state of the hardware offload circuit may be changed, e.g., placed in a known state for purposes of debugging and/or testing.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for hardware offload. In the example of FIG. 1, architecture 100 includes a processor 105, a slave processor 110, and a hardware offload circuit (offload circuit) 115. Each of processor 105 and slave processor 110 is implemented as circuitry, e.g., hardware, that is capable of executing program code. Offload circuit 115 is a hardware version of an application. In the example of FIG. 1, architecture 100 includes a memory controller 120. Processor 105 and offload circuit 115 are coupled to memory controller 120. Through memory controller 120, processor 105 and offload circuit 115 each is capable of accessing (e.g., reading and/or writing) a random-access memory (RAM) 125. RAM 125 may be any of a variety of known types of RAM suitable for use with a processor or processors. Architecture 100 may include one or more additional components and/or systems such as circuitry 130.

In one or more embodiments, portions of architecture 100 are implemented within an IC. For example, processor 105, slave processor 110, offload circuit 115, and memory controller 120 may be implemented within the IC. RAM 125 may be implemented as an "off-chip" memory. If included, circuitry 130 is also included in the IC. In particular embodiments, the IC is a programmable IC that includes programmable circuitry and a hardwired processor. Processor 105 may be implemented as the hardwired processor in the IC, while offload circuit 115 and slave processor 110 are implemented using programmable circuitry. In one or more other embodiments, however, slave processor 110 is also implemented as a hardwired processor. Circuitry 130 represents additional circuits and/or subsystems implemented in programmable circuitry, one or more hardwired circuit blocks within the IC, or a combination of both. In one example, memory controller 120 is implemented as a hardwired circuit block. In another example, memory controller 120 is implemented using programmable circuitry.

In one or more other embodiments, processor 105 is not included in the same IC used to implement slave processor 110, offload circuit 115, and memory controller 120. In that case, processor 105 is implemented as a separate IC. Processor 105 may be remotely located from the IC used to implement slave processor 110, offload circuit 115, and memory controller 120.

In the example of FIG. 1, processor 105 is capable of executing a software framework 140. Software framework 140 is stored in RAM 125 and executed by processor 105. Software framework 140 includes an operating system 145, a runtime 150, one or more applications 155, a productivity language API 160, and a script 165 or other productivity language instructions. Runtime 150 provides functions that facilitate communication between processor 105 and offload circuit 115. For example, runtime 150 provides functions that allow processor 105 to offload tasks to offload circuit 115 and retrieve results from offload circuit 115. As an illustrative and non-limiting example, runtime 150 allows processor 105 to send arguments (e.g., data) as input to offload circuit 115 via connection 170 and receive processing results back from offload circuit 115 via connection 175. Each of the connections illustrated may be implemented to convey multi-bit signals between the noted components.

In one or more other embodiments, processor 105 is capable of providing arguments to offload circuit 115 by storing such arguments within RAM 125. Offload circuit 115 is capable of reading the arguments from RAM 125, operating on the arguments, and generating results that are stored in RAM 125. Accordingly, processor 105 is capable of retrieving the results from offload circuit 115 by reading such results from RAM 125.

Productivity language API 160 is capable of receiving one or more productivity language instructions and executing the instructions. For example, the instructions may be included within script 165. In particular embodiments, productivity language API 160 is capable of wrapping one or more functions of runtime 150 and making such functions available via the productivity language (e.g., script 165). As an illustrative and non-limiting example, a user can interact with productivity API 160 through a user interface (e.g., a graphical user interface, command line, or other suitable interface) to provide productivity language instructions that are executable by productivity language API 160 to control slave processor 110 and, by extension, offload circuit 115. The user can provide the productivity language instructions in real time for purposes of testing and/or debugging offload circuit 115, for example.

As defined herein, an "efficiency-level language" or "ELL" means a programming language, or set of instructions, used to program a data processing system where the instructions have a strong abstraction from the details of the data processing system. ELLs have characteristics such as automating or hiding aspects of operation of the data processing system such as memory management and require compilation into an executable binary. ELLs expose hardware-supported programming models directly. Examples of ELLs include, but are not limited to, C, C++, and other suitable languages. A program written in an ELL is able to achieve multiple orders of magnitude higher performance than a program written in a productivity language particularly on emerging parallel hardware.

A productivity language is typically implemented as a scripting language, e.g. a language where compilation into binary form is not required. In some cases, productivity languages are implemented as extension languages. A productivity language is characterized by a domain-specific (e.g., subject matter) implementation that provides abstractions well-matched to the particular domain of the productivity language. Productivity languages are often dynamically typed programming languages. Productivity languages focus on programmer productivity as opposed to hardware efficiency. In some cases, productivity languages provide utilities for debugging and visualization that are useful for domain experts, but lack support for taking advantage of lower level hardware functions such as parallel processing in systems. Examples of productivity languages include, but are not limited to, Python, Scala, and R. Productivity languages are described in greater detail in "SEJITS: Getting Productivity and Performance With Selective Embedded JIT Specialization," by Catanzaro et al. (May 26, 2014).

In the example of FIG. 1, processor 105 is capable of executing script 165. As discussed, script 165 includes one or more productivity language instructions. Though script 165 is provided for purposes of illustration, in other embodiments, processor 105, in executing productivity language API 160, is capable of executing one or more productivity language instructions provided individually (e.g., as opposed to being included in a script). In executing the productivity language instructions, processor 105 generates one or more corresponding slave processor commands and/or data. Processor 105 is capable of providing the slave processor commands and/or data to slave processor 110 via connection 185. Slave processor 110 is capable of executing the slave processor commands to control offload circuit 115.

For example, through execution of the slave processor commands, slave processor 110 is capable of starting offload circuit 115, monitoring operation of offload circuit 115, stopping offload circuit 115, introspecting memories of offload circuit 115, and/or controlling the internal state of offload circuit 115 (e.g., writing to memories of offload circuit 115). Slave processor 110 is capable of controlling scheduling of offload circuit 115 and further presents a trusted access point for an external productivity language (e.g., executed by processor 105) to interact with the scheduling of offload circuit 115. As used within this disclosure, a "memory of" offload circuit 115 includes any memory that may be written or read by offload circuit 115. Such memories can include memories contained within offload circuit 115 and RAM 125. Examples of memories contained within offload circuit 115 can include, but are not limited to, block RAMs (BRAMs), registers, and first-in-first-out (FIFO) memories.

In the example of FIG. 1, processor 105 is capable of reading and/or writing to any of the memories contained within offload circuit 115 via connection 180. In one or more embodiments, connection 180 is implemented as a Processor Configuration Access Port (PCAP). Processor 105 is capable of reading and/or writing to any of the memories contained within offload circuit 115 through the PCAP. In one or more other embodiments, connection 180 represents a boundary scan interface that processor 105 is capable of using to read and/or write any of the memories contained within offload circuit 115. It should be appreciated that processor 105 is capable of reading and/or writing to any of the memories of offload circuit 115 using any of a variety of different interfaces and/or techniques. In this regard, the examples provided are not intended to be limiting.

In one or more other embodiments, slave processor 110 is coupled to interface 180. Slave processor 110 may be coupled to interface 180 with processor 105, e.g., through a switch or other arbitration circuitry, or in place of processor 105. In any case, in particular embodiments, slave processor 110 is capable of reading from and writing to any memories of offload circuit 115 under control of processor 105.

In the example of FIG. 1, offload circuit 115 includes a sequencer 135. Sequencer 135 is capable of controlling operations within offload circuit 115. For example, sequencer 135 is capable of providing control signals throughout offload circuit 115 to control the sequencing of operations and the flow of data within offload circuit 115. In one or more embodiments, sequencer 135 is implemented as a state machine. Slave processor 110 is coupled to sequencer 135 and is capable of determining the state of offload circuit 115 based on signals of sequencer 135 that are provided to slave processor 110, e.g., one or more of the control signals generated by sequencer 135 to control operation of offload circuit 115 and/or signals generated by sequencer 135 that indicate the status of offload circuit 115. Slave processor 110 is capable of providing control signals to sequencer 135 to control the operation of sequencer 135 and, by extension, offload circuit 115. For example, slave processor 110 is capable of providing control signals to sequencer 135 to implement operations such as stopping offload circuit 115, starting offload circuit 115, stepping the clock of offload circuit 115, and/or allowing the clock of offload circuit 115 to roll or continue for a predetermined number of clock signals.

In particular embodiments, the program code executed by slave processor 110 may be fully generated or partially generated at the time that slave processor 110 is generated (e.g., synthesized) with offload circuit 115. For example, since sequencer 135 is generated when the program code from which offload circuit 115 is derived is synthesized, placed, and routed, an electronic design automation (EDA) system is capable of generating compiled program code that is executed by slave processor 110. The program code allows slave processor 110 communicate with processor 105 and with offload circuit 115 via sequencer 135. Further, the program code allows slave processor 110 to monitor for the occurrence of particular operating states within offload circuit 135 as determined from sequencer 135. More particularly, the program code allows slave processor 110 to detect particular operating states based on the states of signals of sequencer 135 that are coupled to slave processor 110.

In the example of FIG. 1, slave processor 110 is coupled to circuitry 130 and input/output (I/O) signals 145. As such, slave processor 110 is capable of monitoring other signals within the IC (e.g., from circuitry 130) and/or other signals conveying data received from systems or circuits external to the IC (I/O signals 145). In this manner, slave processor 110 is capable of not only detecting particular operating states of offload circuit 115, but also detecting such operating states of offload circuit 115 in combination with the states of one or more other signals from circuitry 130 and/or I/O signals 145. Thus, slave processor 110 is capable of detecting when offload circuit 115 is in a particular operating state and one or more of signals from circuitry 130 and/or I/O signals 145 are also in a particular state. As such, slave processor 110 is capable of synchronizing the point at which a user is able to observe offload circuit 115 with other signals and/or systems.

As an illustrative and non-limiting example, slave processor 110 is capable of monitoring and detecting a particular operating state as described. In response to detecting the operating state of offload circuit 115 and/or the state of one or more other signals, slave processor 110 is capable of stopping offload circuit 115. In response to stopping offload circuit 115, slave processor 110 is capable of informing processor 105 that offload circuit 115 is stopped and that memories of offload circuit 115 may be introspected. Upon completion by processor 105, processor 105 is capable of providing a command to slave processor 110 informing slave processor 110 to start offload circuit 115.

Figure 2:
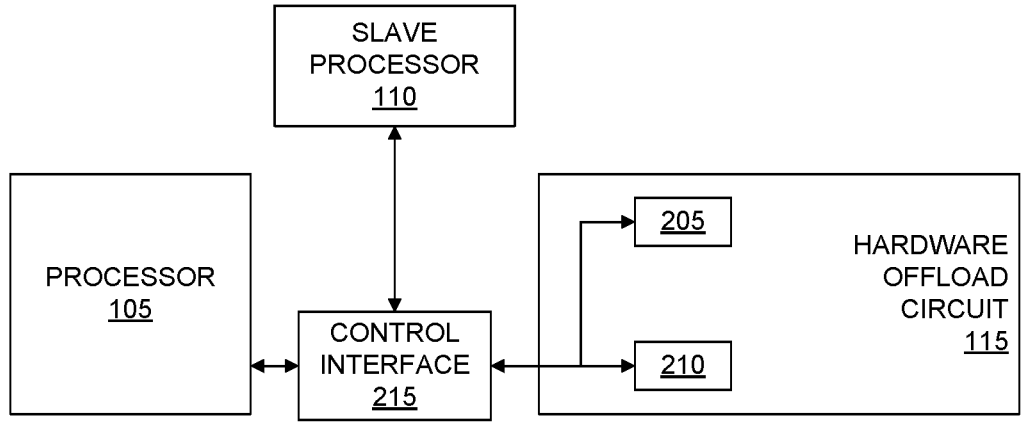
FIG. 2 illustrates example internal memories of the hardware offload circuit of FIG. 1.

FIG. 2 illustrates example internal memories of offload circuit 115. In the example of FIG. 2, offload circuit 115 includes internal memories 205 and 210. As discussed, internal memories 205 and 210 may be implemented as, or represent, one or more BRAMs (which may include URAMs), one or more FIFOs, one or more buffers, one or more registers, or other internal memory circuits of offload circuit 115.

Control interface 215 may be implemented as a PCAP or a boundary scan connection. The example of FIG. 2 illustrates that processor 105 is capable of reading from and/or writing to internal memories 205 and 210 of offload circuit 115. As an illustrative and non-limiting example, processor 105 is capable of sending commands to slave processor 110. Slave processor 110 is capable of executing the commands and, in response to executing selected ones of the commands, stopping offload circuit 115. With offload circuit 115 stopped, processor 105 is capable introspecting the state of offload circuit 115 by reading data from internal memories 205 and 210 and/or RAM 125.

In another embodiment, slave processor 110 is capable of reading from and/or writing to internal memories 205 and 210 of offload circuit 115. As an illustrative and non-limiting example, processor 105 is capable of sending commands to slave processor 110. Slave processor 110 is capable of executing the commands to read and/or write to memories 205 and/or 210 in response to the commands. In particular embodiments, slave processor 110 is capable of monitoring memories 205 and 210 for the occurrence of particular data items and/or patterns. Slave processor 110 is capable of notifying processor 105 in response to detecting such data items(s) and/or patterns.

Figure 3:
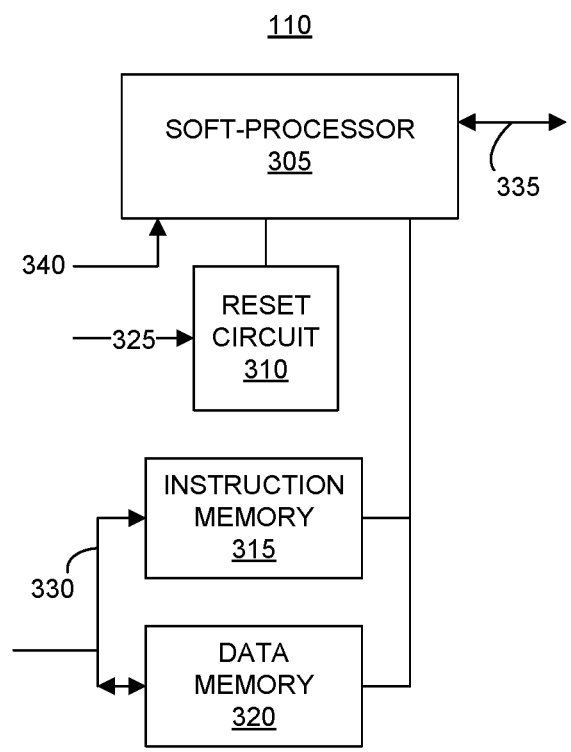
FIG. 3 illustrates an example of the slave processor of FIG. 1.

FIG. 3 illustrates an example of slave processor 110. In one or more embodiments, slave processor 110 is implemented entirely within programmable circuitry of an IC. Further, slave processor 110 is capable of operating entirely under control of a processor such as processor 105. In the example of FIG. 3, slave processor 110 includes a soft-processor 305. Slave processor 110 has a dual port design. The dual port design uses separate memories for data and instructions. In support of the dual port design, slave processor 110 includes an instruction memory 315 and a data memory 320. In particular embodiments, instruction memory 315 and data memory 320 are implemented using BRAMs of the programmable circuitry. Further, slave processor 110 can include a reset circuit 310.

Soft-processor 305 is capable of accessing or reading instructions from instruction memory 315 and data from data memory 320. Soft-processor 305 is capable of executing the instructions retrieved from instruction memory 315 and operating on data retrieved from data memory 320. Soft-processor 305 is capable of writing results from execution to data memory 320. Processor 105 is capable of reading data, e.g., results, from data memory 320.

In one or more embodiments, slave processor 110 is coupled to processor 105 via one or more control signals 325, an interface 330, and interrupt signal 340. In one or more embodiments, interrupt signal 340 is optional. In particular embodiments, interface 330 is implemented as an on-chip interconnect. An example of an on-chip interconnect is an Advanced Microcontroller Bus Architecture (AMBA) eXtensible Interface (AXI) bus. An AXI bus is an embedded microcontroller bus interface for use in establishing on-chip connections between circuit blocks and/or systems. In general, AXI is a high performance, high frequency interface that is suitable for submicron interconnect. AXI is provided as an example of an interface that can be used to couple systems and/or circuit blocks. Other example implementations of an interconnect include, but are not limited to, buses, cross-bars, network on chips (NoCs), switches, and so forth. It should be appreciated that processor 105 can be coupled to slave processor 110 using any suitable on-chip interconnects or interfaces.

Slave processor 110 optionally includes an interface 335 that is capable of coupling soft-processor 305 to other circuitry within the IC such as offload circuit 115, circuitry 130, and/or I/O signals 145. In particular embodiments, interface 335 is implemented as an AXI interface. Through interface 335, slave processor 110 appears as a master to other circuits connected to slave processor 110. In embodiments where circuitry 130 and/or I/O signals 145 are not coupled to slave processor 110, interface 335 still may be used to connect to offload circuit 115.

Reset circuit 310 is capable of receiving one or more signals and exercising the reset function of soft-processor 305 in response to detecting a particular condition or conditions on control signals 325. In one or more embodiments, control signals 325 are provided by processor 105. Reset circuit 310 is capable of generating a non-maskable interrupt (NMI). The NMI may be a state control that is handled by soft-processor 305. For example, reset circuit 310 is capable of restarting soft-processor 305 to restart executing same instructions (e.g., program code) from instruction memory, resetting soft-processor 305 to execute new and/or different instructions from memory, holding soft-processor 305 in reset, or providing other interrupts that are handled differently by soft-processor 305 based upon the type of interrupt received.

Slave processor 110 further may include an interrupt port coupled to signal 340. Signal 340 may also be provided by processor 105 and provides a less severe mechanism for gaining access to soft-processor 305 that does not require a complete reset.

Using control signals 325, interrupt signal 340, and interface 330, processor 105 is capable of controlling operation of slave processor 110. Processor 105 is capable of behaving as a master to slave processor 110. As an illustrative and non-limiting example, processor 105 is capable of starting, stopping, and resetting slave processor 110 at any time. Processor 105 is capable of providing, e.g., writing, instructions to instruction memory 315 via interface 330 during runtime of the IC, e.g., in real-time. In particular embodiments, instructions written to instruction memory 315 can include read-only data such as tables or other suitable data. Processor 105 is capable of providing, e.g., writing, data to data memory 320 via interface 330. Processor 105 further is capable of providing any data to be operated upon by soft-processor 305 and loading such data into data memory 320 during runtime, e.g., in real-time.

As such, processor 105 is capable of performing runtime customization of slave processor 110. Processor 105 can allow slave processor 110 to operate. At some point, processor 105 is capable of halting operation of slave processor 110, e.g., via reset circuit 310, loading different or new instructions into instruction memory 315 and/or different or new data into data memory 320. Processor 105 is capable of resetting and/or restarting (e.g., releasing soft-processor 305 from the halt) operation of soft-processor 305 to begin executing the new instructions and/or to begin processing the new data. Appreciably, processor 105 may load new instructions into instruction memory 315 while soft processor 305 is halted. Processor 105 is capable of writing to data memory 320 without halting operation of soft-processor 305.

Processor 105, in acting as the master, is capable of exchanging instructions and/or data with soft-processor 305 via instruction memory 315 and data memory 320. As an illustrative and non-limiting example, data memory 320 includes a region or portion of memory that is reserved for use by processor 105. The region, e.g., a command mailbox, can be written by processor 105 and is read-only for soft-processor 305. The region is reserved for receiving command(s) from processor 105. This allows processor 105 to issue commands to soft-processor 305 without having to halt operation of soft-processor 305. In general, processor 105 is capable of causing soft-processor 305 to behave differently by writing one or more commands to the command mailbox within data memory 320.

Soft processor 305, for example, is capable of executing operational program code stored within instruction memory 315. Processor 105 is capable of altering the flow of execution by updating data in the command mailbox within data memory 320 dynamically during operation of slave processor 110. In one or more other embodiments, slave processor 110 is capable of communicating the status of offload circuit 115, e.g., whether running or stopped, by writing into a designated address of data memory 320 that may be read by processor 105.

As an illustrative and non-limiting example, soft-processor 305 may be configured to monitor the state of operation of offload circuit 115 through sequencer 135. In an aspect, a memory address or addresses within the command mailbox of instruction memory 315 can be reserved for receiving command(s) from processor 105 that enable and/or disable particular breakpoints. The breakpoints correspond to particular operating states for which slave processor 110 is monitoring in offload circuit 115 (and/or in circuitry 130 and/or I/O signals 145). Thus, processor 105 is capable of writing a command to the address or addresses within the command mailbox to control whether slave processor 110 stops offload circuit 115 in response to detecting the particular operating states. In another example, processor 105 can write read-only data, e.g., a data table, to the command mailbox, where the table specifies the breakpoints (operating states) that, if detected by slave processor 110, cause slave processor 110 to stop offload circuit 115.

The instructions provided from processor 105 to instruction memory 315 can originate from one or more different sources. In particular embodiments, processor 105 is capable of providing precompiled binaries to instruction memory 315. The precompiled binaries may be provided to processor 105 at boot time (of processor 105). In an aspect, the precompiled binary of a given slave processor is stored as part of the configuration bitstream that implements slave processor 110 and/or offload circuit 115. The precompiled binary is specifically targeted to interacting with the sequencer of a specific offload circuit.

In one or more embodiments, slave processor 110 is capable of generating or raising an interrupt on processor 105. In particular embodiments, soft-processor 305 is capable of raising an interrupt on processor 105 via interface 330 (not shown). In particular embodiments, soft-processor 305 may be implemented with a direct connection to an interrupt port of processor 105 to raise an interrupt on processor 105. Slave processor 110 is capable of generating the interrupt to indicate that offload circuit 115 is stopped and/or the particular state of offload circuit 115 that was detected and caused slave processor 110 to stop offload circuit 115. In one or more embodiments, the interrupt mechanisms used by slave processor 110 and processor 105 are integrated within an asynchronous event loop implemented in the productivity language API provided by processor 105 to support high-level nonblocking I/O.

As an illustrative and non-limiting example, consider the case where offload circuit 115 is configured to perform a complex operation such as video processing or encryption. Sequencer 135 is implemented as part of high-level synthesis to control the sequence of operations performed by offload circuit 115. Slave processor 110 is capable of overseeing the sequencing of operations performed by sequencer 135 and is capable of stopping or starting offload circuit 115 at different stages within that sequence of operations in order to observe the internal state of offload circuit 115.

As a more specific example, offload circuit 115 is capable of processing frames of video. Slave processor 110 is capable of monitoring offload circuit 115 to detect when each successive frame of video is being processed. Processor 105, is capable of commanding slave processor 110 to stop offload circuit 115 when a particular frame of video is being processed. Script 165, for example, may specify breakpoints such as the $10^{th}$ frame of video, the $50^{th}$ frame of video, and the $1000^{th}$ frame of video. Processor 105 may update instruction memory 315 and/or data memory 320, whether as instructions, a data table or using the command mailbox, to specify the particular frames of data to be detected by slave processor 110. Slave processor 110 monitors operation of offload circuit 115 and stops offload circuit 115 in response to detecting the $10^{th}$ frame of video being processed, the $50^{th}$ frame of video being processed, and the thousandth frame of video being processed.

It should be appreciated, that after encountering each breakpoint, slave processor 110 notifies processor 105 that offload circuit 115 is stopped. At that point, further productivity language instructions may be provided to processor 105 and executed to introspect memories of offload circuit 115. Further, processor 105 is capable of comparing any data read from memories of offload circuit 115 with and/or expected data. As such, processor 105 is capable of performing debugging operations to determine whether the internal state of intermediate data in memories of offload circuit 115, at any given time, coincides with the expected and/or correct state of the intermediate data.

In one or more embodiments, the introspection of intermediate data structures stored within memories of offload circuit 115 is performed within the productivity language environment of processor 105. As discussed, the productivity language API is capable of wrapping particular functions of runtime 150. Further, in performing synthesis, placement, and/or routing to generate offload circuit 115 and slave processor 110, implementation data is generated that may be stored within software framework 140 and used by script 165 and or productivity language API 160. This implementation data allows the productivity language environment executing and processor 105 to interface with and interact with offload circuit 115 and/or memories thereof.

Figure 4:
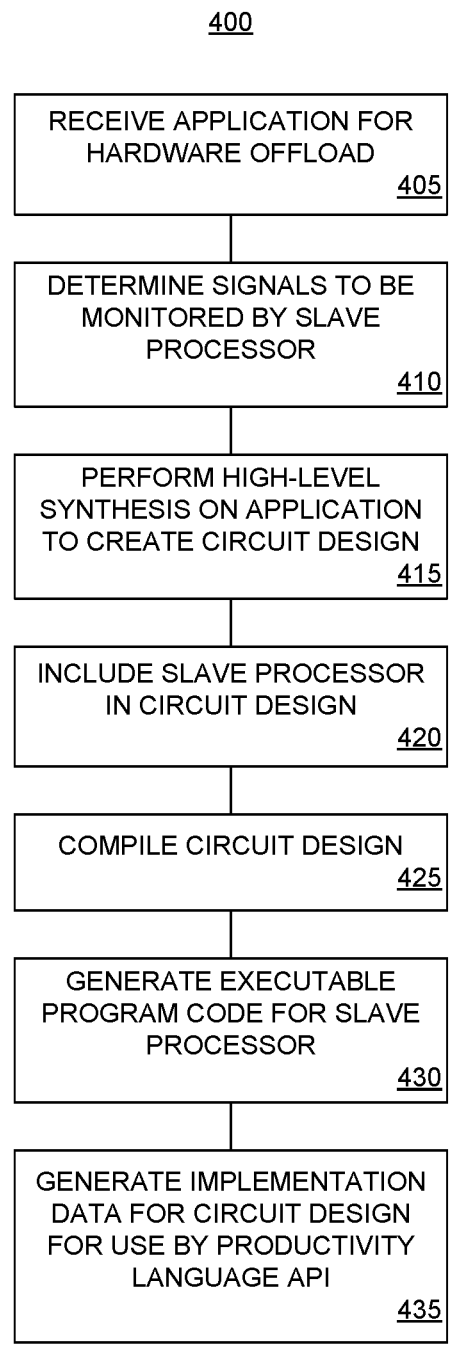
FIG. 4 illustrates an example method of implementing a hardware offload platform.

FIG. 4 illustrates an example method 400 of implementing a hardware offload platform. Method 400 may be performed by an EDA system (system) as described herein in connection with FIG. 6. The EDA system is capable of processing a user application intended for hardware offload and implement an architecture in hardware as described in connection with FIG. 1.

In the example of FIG. 4, method 400 begins in block 405 where the system receives and application for hardware offload. For example, the application may be a user application specified in any of a variety of ELLs as described herein. Another example of an ELL used to specify an application designated for hardware offload includes OpenCL.

In block 410, the system determines one or more signals to be monitored by the slave processor. For example, in working with the system, a user is able to specify one or more I/O signals that are received by the IC in which the application is to be hardware offloaded. In another example, where the IC implements additional circuitry, the user may select one or more signals of such circuitry to be routed to the slave processor for purposes of monitoring operating state of the signals. The system identifies the user-specified signals. As discussed, by specifying I/O signals and/or other signals, the detection of particular operating states of the offload circuit by the slave processor can be synchronized with other hardware systems and/or circuits, whether within the IC or external to the IC.

In block 415, the system performs high-level synthesis on the application received in block 405 to create a circuit design. For example, the system is capable of performing a first compilation process that translates the application from an ELL into a hardware description language (HDL). In particular embodiments, the system is capable of exposing signals of the sequencer of the offload circuit. The sequencer signals, for example, can be exposed and subsequently routed to the slave processor.

In block 420, the system includes a slave processor in the circuit design. The slave processor may be specified in HDL, as a core, as a netlist, or as a placed and routed circuit design. As part of including the slave processor in the circuit design, the system is capable of creating any required circuit interfaces. Further, the system is capable of connecting the slave processor to the offload circuit (e.g., connecting the signals of the sequencer to the slave processor), the offload circuit to the processor, and any designated signals (e.g., from block 410) to the slave processor for purposes of monitoring operational states.

In block 425, the system is capable of performing further compilation of the circuit design. For example, the system is capable of performing synthesis, placement, routing, and configuration bitstream generation. The configuration bitstream may be loaded into an IC. Example architectures for an IC are described herein in connection with FIGS. 7 and 8.

In block 430, the system is capable of generating executable program code for the slave processor. For example, because the system has implemented the sequencer within the offload circuit, the system is capable of generating program code that, when executed by the slave processor, enables the slave processor to monitor the necessary control signals within the offload circuit (e.g., within the sequencer). For example, the program code, when executed, causes the slave processor to detect different operating states of the offload circuit based upon the signals from the sequencer. The program code, when executed by the slave processor, causes the slave processor to provide control signals to the sequencer to stop operation of the offload circuit, start operation of the offload circuit, step operation of the offload circuit, and/or step operation of the offload circuit for a particular number of clock cycles.

For example, if the sequencer includes a particular number of signals (e.g., single bit signals), the number of operating states that can be detected by the slave processor is a function of the number of single bit signals (e.g., $2^n$ signals). In this regard, the system is capable of generating at least partial program code for the slave processor based upon the number of sequencer signals and/or other signals (from other circuitry and/or I/O signals that are routed to the slave processor). The number of signals provided to the slave processor can be exported from the system and passed to a software generator to generate case statements for the different states and/or at least partially complete a slave application template.

In one or more embodiments, the program code for the slave processor may be included within the configuration bitstream that is generated. Accordingly, upon loading the configuration bitstream into an IC, the slave processor is effectively preloaded with executable program code and/or data within the respective memories. In one or more other embodiments, another processor such as processor 105 is capable of loading any generated program code and/or data within the respective memories of the slave processor after the slave processor has been implemented or instantiated in the programmable circuitry.

In block 435, the system is capable of writing out implementation data for the circuit design for use by the productivity language API. For example, the system is capable of writing out implementation data generated during compilation of the circuit design that allows the productivity language API to map functions onto hardware addresses of the offload circuit and/or memories of the offload circuit. The implementation data provides the productivity language environment with knowledge of the particular data structures and/or control registers of the offload circuit that may be accessed by the slave processor.

While FIG. 4 describes examples where program code for the slave processor is at least partially generated automatically, in other embodiments, program code executed by the slave processor may be written by a designer. In either case, the program code can be provided within the configuration bitstream specifying the slave processor (and the offload circuit) and/or updated after implementation of the slave processor.

Figure 5:
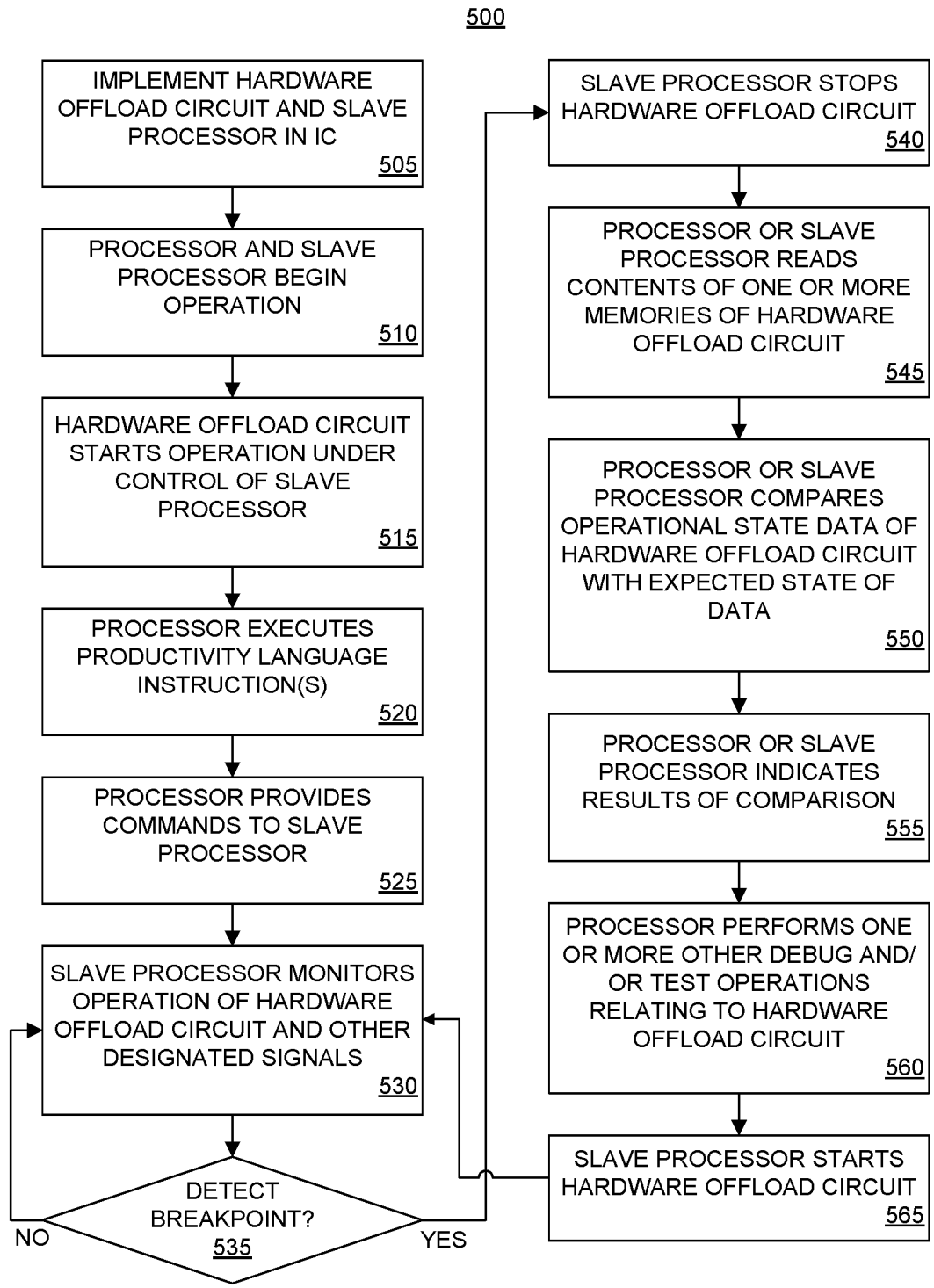
FIG. 5 illustrates an example method of operating a hardware offload platform.

FIG. 5 illustrates an example method 500 of operating a hardware offload platform. Method 500 may be performed by the example architecture described in connection within FIG. 1. For example, a configuration bitstream specifying the slave processor and the offload circuit and any necessary interfaces is loaded into an IC thereby physically implementing an architecture the same as or similar to the architecture of FIG. 1 within the IC. Any implementation data generated as described in connection with FIG. 4 is incorporated within software framework 140 executed by processor 105.

In block 505, the offload circuit and the slave processor are implemented within the IC. As discussed, the IC may be loaded with a configuration bitstream that specifies the offload circuit and the slave processor.

In block 510, the processor and the slave processor begin operation. For example, the processor begins executing the framework including any applications contained therein. The slave processor begins operating by executing executable code that has been provided to the slave processor or that was included within the slave processor upon implementation as described herein. In block 515, the offload circuit starts operation under control of the slave processor. For example, the slave processor, in response to a command from the processor, may start operation of the offload circuit.

In block 520, the processor is capable of executing one or more productivity language instructions. For example, the processor is capable of executing a script specifying one or more productivity language instructions. In other examples, the processor executes a productivity language instruction provided by a user through the productivity language API. The processor, in response to executing the productivity language instructions, generates one or more commands for the slave processor.

In block 525, in response to executing the productivity language instructions, the processor is capable of providing one or more commands to the slave processor. The commands may include data that may be written to the data memory of the slave processor and/or instructions that may be written to the instruction memory of the slave processor (e.g., after being halted). Commands provided from the processor to the slave processor allow the processor to change the way in which the slave processor operates dynamically at runtime. Each command, for example, may include a payload that includes data and/or instructions to be written to the instruction memory and/or the data memory of the slave processor.

In block 530, the slave processor monitors operation of the offload circuit and any other designated signals of the IC. In block 535, the slave processor determines whether a breakpoint is detected based upon the control signals of the offload circuit being monitored and/or any other signals of the IC being monitored. In one aspect, a breakpoint specifies one or more signals and corresponding states of the signals that may be detected by the slave processor. In particular embodiments, the slave processor is programmed to detect a plurality of different breakpoints. In response to detecting a breakpoint, method 500 continues to block 540. If a breakpoint is not detected, method 500 loops back to block 530 to continue monitoring.

In block 540, the slave processor stops the offload circuit. The slave processor is capable of stopping the offload circuit in response to detecting a breakpoint. Further, the slave processor is capable of notifying the processor when the offload circuit is stopped. The slave processor is capable of notifying the processor of the particular breakpoint that has been detected. In block 545, the processor or the slave processor optionally reads contents of one or more memories of the offload circuit.

In block 550, the processor or the slave processor optionally compares the state of data introspected from the memories with an expected state of the data from the memories. In one or more embodiments, the processor is capable of storing an expected state of data for one or more memories of the offload circuit for one or more different breakpoints in RAM 125. The slave processor is capable of storing an expected state of data for one or more memories of the offload circuit for one or more different breakpoints in the internal data memory. Each expected state of data specifies contents, e.g., an intermediate state of data, stored in one or more memories of the offload circuit. In this manner, the processor or the slave processor is capable of determining whether the offload circuit is operating as expected by comparing the data read from the memor(ies) of the offload circuit with expected data for the offload circuit.

In one or more other embodiments, the processor is capable of executing an executable version of the original application that was hardware offloaded. The processor is capable of stopping execution of the application at breakpoints corresponding to the breakpoints set for the offload circuit. In this example, the processor is capable of comparing actual data generated from execution of the application with actual data generated from operation of the hardware offloaded application to determine whether the data matches. A mismatch indicates an error in operation of the offload circuit or the execution of the application.

As an illustrative and non-limiting example, the offload circuit may be an implementation of a neural network. In this example, breakpoints may be set so that feature map of the neural network may be inspected at a particular point during operation. Further, the state of the feature map of the offload circuit may be compared to a feature map generated by an executable version of the neural network that is executed by the processor, or that has been generated ahead of time by another processor and made available to processor 105 for purposes of comparison.

In another example, the slave processor may receive a signal indicating when a particular layer in the neural network has finished processing. The slave processor can detect states when different layers have finished processing. The processor or the slave processor can introspect the memories of the offload circuit to determine the state of the data stored therein, e.g., the state of intermediate results.

In another example, consider the case where the offload circuit is a video processor. In that case, the operating states may be data driven and related to frames of video being processed. The signals of the offload circuit exposed to the slave processor may include a signal indicating when a frame of video has been processed. This allows the slave processor to detect each time that the offload circuit completes processing a frame of video. The slave processor, for example, can stop operation of the offload circuit after each frame of video is processed and introspect the memories to determine whether a particular data pattern is detected. The slave processor may be programmed to notify the processor only in response to detecting the particular data pattern in a frame. This allows the processor to continue operating on other tasks while the slave processor performs the state detection and introspection relating to the offload circuit.

In yet another example, the slave processor may receive a signal indicating when the offload circuit has completed a write to memory. This allows the slave processor to stop operation of the offload circuit after a write to memory. The processor or the slave processor can introspect the memory and determine the state of the data stored therein.

In block 555, the processor or slave processor optionally indicates the results of the comparison. For example, the processor or the slave processor can indicate whether the intermediate data obtained from the offload circuit matches the expected intermediate data. Any indications output by the processor or the slave processor may also specify the particular breakpoint that was detected using a code or other identifier.

In block 560, the processor optionally performs one or more other debug and/or test operations relating to the offload circuit. For example, the processor is capable of instructing the slave processor to single step operation of the offload circuit (through control of the clock signal). In that case, the slave processor causes the offload circuit to start operation for a single clock cycle.

In another example, the processor is capable instructing the slave processor to allow the offload circuit to operate for only a predetermined number of clock cycles and stop after the predetermined number of clock signals. In that case, the slave processor causes the offload circuit to start operation, continue for the predetermined number of clock cycles, and then stop.

In another example, the processor is capable of writing new data to particular addresses of memories of the offload circuit. By writing new data to memories of the offload circuit, the processor is capable of allowing the offload circuit to continue operation from a known state that is controlled by the processor. At any point where the offload circuit is stopped (e.g., including after stepping operation and/or after running for a predetermined number of clock cycles), the processor is capable of reading memor(ies) of the offload circuit for purposes of determining the operational state and/or comparing such operational state with an expected operational state.

In each of the above examples, the processor is capable of controlling operation of the slave processor by providing appropriate commands thereto. Further, as noted, the processor is capable of modifying the instructions, and/or data used by the slave processor at any given time. For example, the processor is capable of temporarily halting operation of the slave processor, loading new instructions, and/or data within the respective memories of the slave processor, and then restarting operation of the slave processor.

In block 565, the slave processor starts the offload circuit. In one or more embodiments, the slave processor starts the offload circuit in response to a command received from the processor. For example, a user may provide a productivity language instruction to the productivity API to start the offload circuit. The processor commands the slave processor to start the offload circuit. The slave processor, in response to the command from the processor, starts the offload circuit. After block 565, method 500 is capable of looping back to block 530, to continue operation.

Figure 6:
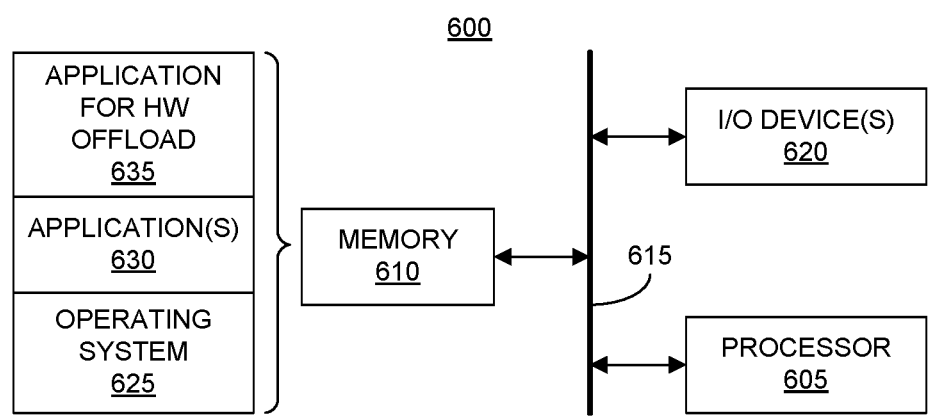
FIG. 6 illustrates an example system including computer hardware for use with one or more embodiments described herein.

FIG. 6 illustrates an example system 600 for use with one or more embodiments described herein. System 600 is an example of computer hardware that may be used to implement an EDA system. For example, system 600 represents a computer, a server, a portable computer such as a laptop or a tablet computer, or other data processing system. A system or device implemented using computer hardware is capable of performing the various operations described herein relating to hardware offloading an application and/or implementing a circuit design within an IC.

In the example of FIG. 6, system 600 includes at least one processor 605. Processor 605 is coupled to memory 610 through interface circuitry 615. System 600 is capable of storing computer readable instructions (also referred to as "program code") within memory 610. Memory 610 is an example of computer readable storage media. Processor 605 is capable of executing the program code accessed from memory 610 via interface circuitry 615.

Memory 610 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 600 may also include one or more cache memories (not shown) that provide temporary storage of at least some program code in order to reduce the number of times program code must be retrieved from a bulk storage device during execution.

Memory 610 is capable of storing program code and/or data. For purposes of illustration, memory 610 stores an operating system 625, one or more application(s) 630, and an application for hardware (HW) offload 635. In one or more embodiments, application(s) 630 include an EDA application. The EDA application is capable of performing high-level synthesis, a design flow (e.g., synthesis, placement, routing, and/or bitstream generation), and generation of executable program code for the slave processor.

System 600, e.g., processor 605, is capable of executing operating system 625 and application(s) 630 to perform the operations described within this disclosure. As such, operating system 625 and application(s) 630 may be considered an integrated part of system 600. Further, it should be appreciated that any data used, generated, and/or operated upon by system 600 (e.g., processor 605) are functional data structures that impart functionality when employed as part of the system.

Examples of interface circuitry 615 include, but are not limited to, a system bus and an input/output (I/O) bus. Interface circuitry 615 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 600 further may include one or more I/O devices 620 coupled to interface circuitry 615. I/O devices 620 may be coupled to system 600, e.g., interface circuitry 615, either directly or through intervening I/O controllers. Examples of I/O devices 620 include, but are not limited to, a keyboard, a display device, a pointing device, one or more communication ports, and a network adapter. A network adapter refers to circuitry that enables system 600 to become coupled to other systems, computer systems, remote printers, and/or remote storage devices through intervening private or public networks. Modems, cable modems, Ethernet cards, and wireless transceivers are examples of different types of network adapters that may be used with system 600.

System 600 may include fewer components than shown or additional components not illustrated in FIG. 6 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 600 may be used to implement a single computer or a plurality of networked or interconnected computers each implemented using the architecture of FIG. 6 or an architecture similar thereto.

ICs can be implemented to perform a variety of functions. Some ICs can be programmed to perform specified functions. An example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/ output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic.

Figure 7:
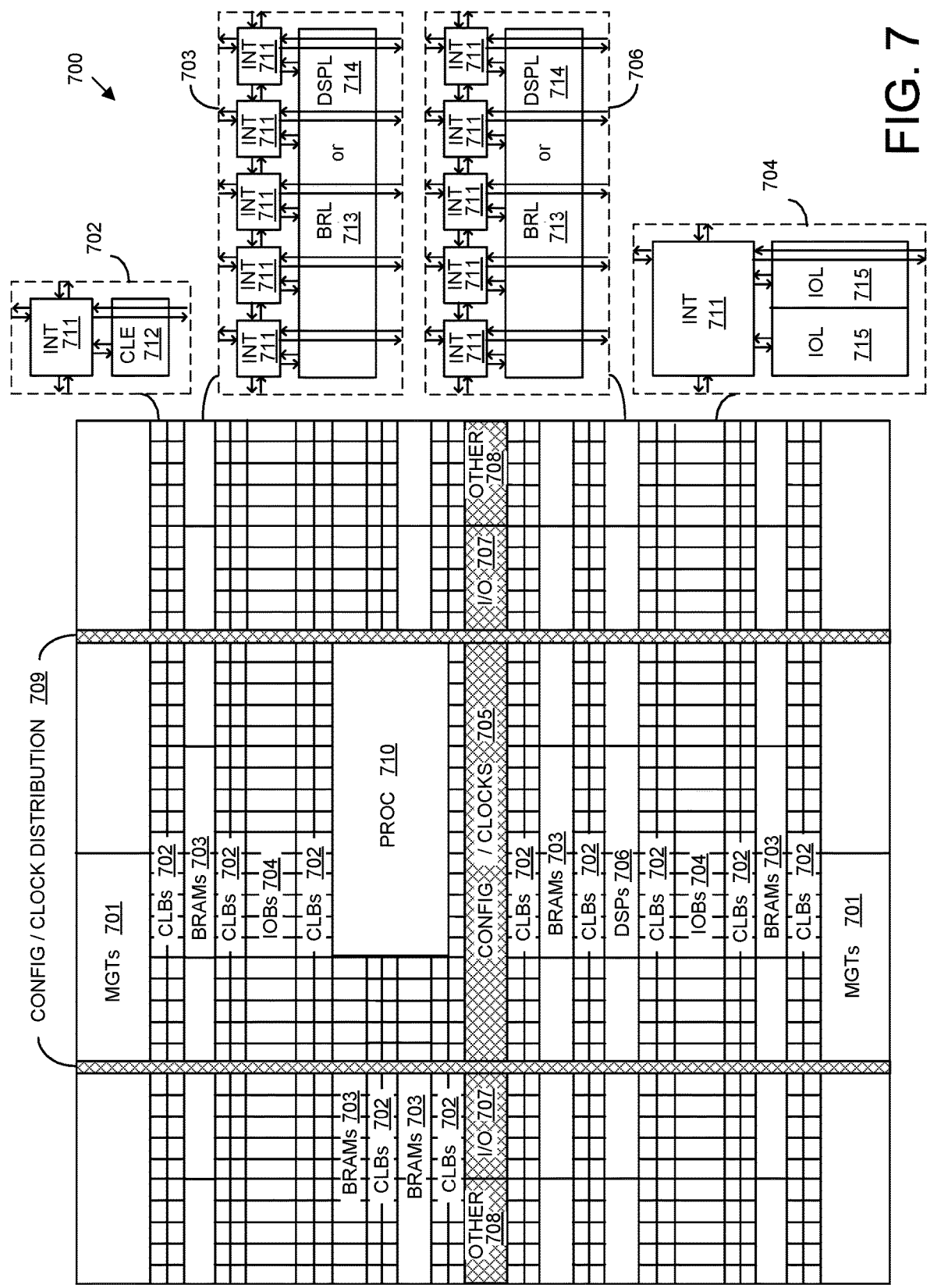
FIG. 7 illustrates an example architecture for an integrated circuit (IC).

FIG. 7 illustrates an example architecture 700 for an IC. In one aspect, architecture 700 may be implemented within a programmable IC. For example, architecture 700 may be used to implement a field programmable gate array (FPGA). Architecture 700 may also be representative of a system-on-chip (SoC) type of IC. An SoC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An 10B 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

In the example of FIG. 7, PROC 710 may be used to implement processor 105, while slave processor 110 and offload circuit 115 may be implemented using the programmable circuitry of architecture 700.

Figure 8:
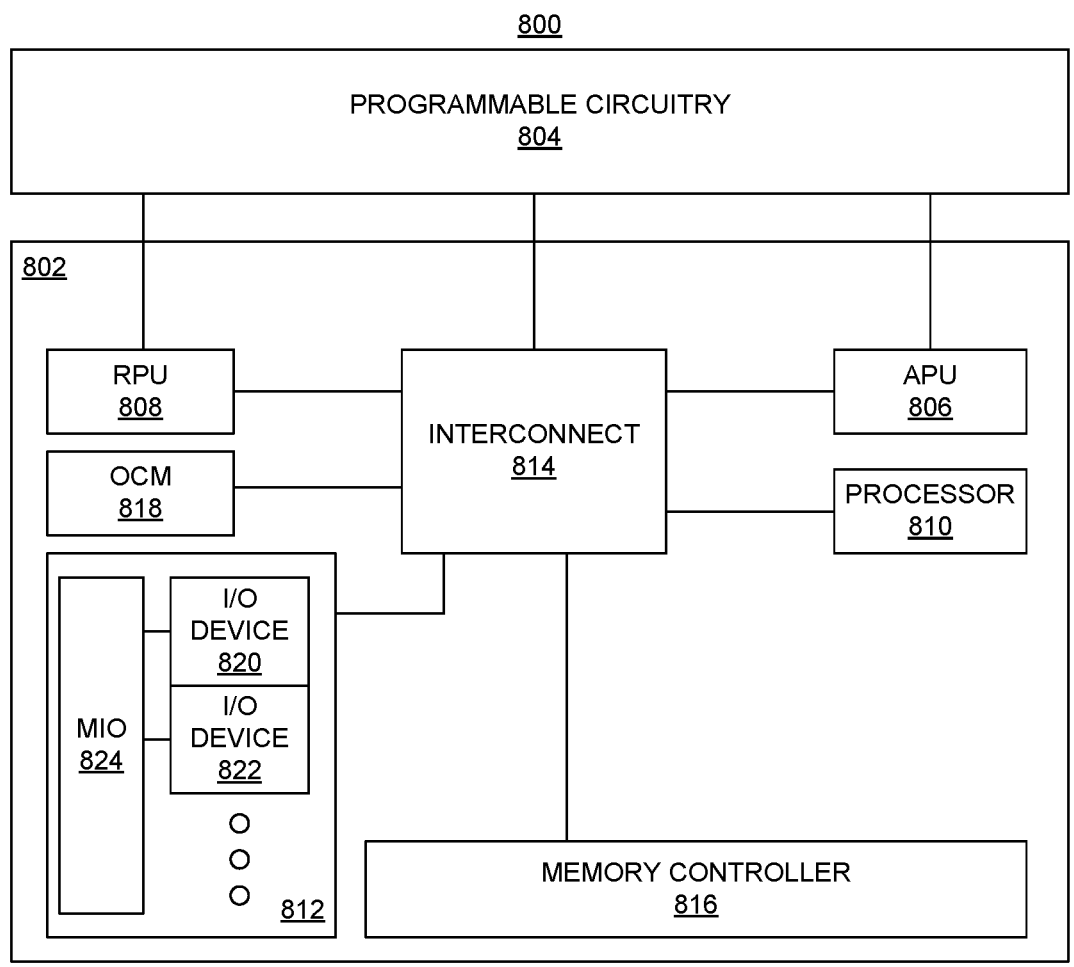
FIG. 8 illustrates another example architecture for an IC.

FIG. 8 is another example architecture 800 for an IC. Architecture 800 may be implemented similar to that described with reference to FIG. 10. In the example of FIG. 8, architecture 800 includes a processor system described in greater detail.

In the example of FIG. 8, architecture 800 includes a processor system 802 and programmable circuitry 804. Processor system 802 is a hardwired region of architecture 800 that includes two or more processors that are configured to execute program code. In one or more embodiments, programmable circuitry 804 may be implemented as FPGA circuitry and/or programmable logic. Due to the inclusion of programmable circuitry 804, architecture 800 may also be referred to as a programmable SoC.

Processor system 802 includes a variety of different processors. In one aspect, the different processors of processor system 802 are physically distinct instances, but have same architectures (use same instruction sets). In another aspect, the different processors of processor system 802 are physically distinct instances and utilize two or more different architectures (e.g., utilize different instruction sets). In the example of FIG. 8, processor system 802 includes an application processing unit (APU) 806, a real-time processing unit (RPU) 808, and/or processor 810.

APU 806 may include one or more cores. For purposes of discussion within this disclosure, a core is considered a "processor" that is configured to execute program code. RPU 808 may include one or more cores. In one or more embodiments, RPU 808 is capable of executing real-time applications. Examples of real-time applications include, but are not limited to, automotive, mass storage, mobile baseband, medical, and/or industrial applications. Both APU 806 and RPU 808 may be directly connected to programmable circuitry 804 through interconnect circuitry (not shown).

In one or more embodiments, the slave processor may be implemented using RPU 808. In that case, the slave processor is hardwired. Still, the slave processor is coupled to the programmable circuitry and, as such, may be coupled to the offload circuit implemented in the programmable circuitry. In that case, though the RPU 808 is not synthesized, the signals of the sequencer and any other designated signals still may be coupled to RPU 808 so that RPU 808 is able to monitor for the occurrence of particular operating states of the offload circuit and/or operating states of the offload circuit synchronized with the state of one or more other signals. RPU 808 may operate under control of processor 810 (where processor 810 corresponds to processor 105).

As noted, in one aspect, the different processors (e.g., including cores) may have different architectures. In one example, processor 810 is implemented as a hardened version of the MicroBlaze™ processor from Xilinx, Inc. of San Jose, Calif. APU 806 may be implemented as a multicore processor from Arm Ltd. of Cambridge, UK such as the ARM CORTEX-A9. RPU 208 may be implemented as an ARM CORTEX-R5 processor also available from Arm Ltd. The example processor architectures described herein are provided for purposes of illustration. One skilled in the art will appreciate that other architectures may be used for implementing processors in architecture 800 such as an x86 processor architecture and so forth.

Processor system 802 further may include an input/output (I/O) subsystem 812, interconnect 814, a memory controller 816, and on-chip memory (OCM) 818. In the example of FIG. 8, interconnect 814 is coupled to RPU 808, OCM 818, APU 806, processor 810, I/O subsystem 812, and memory controller 816.

In one or more embodiments, interconnect 814 is implemented as an on-chip interconnect as previously described herein. I/O subsystem 812 includes a plurality of I/O devices such as I/O devices 820 and 822. I/O subsystem 812 may include more than two I/O devices. Each of I/O devices 820 and 822 is coupled to a multiplexer I/O (MIO) 824. MIO 824 is configurable to provide processor system 802 and/or programmable circuitry 804 with access to nodes external to architecture 800 and to the various I/O devices of architecture 800. MIO 824 may be configured on a per pin basis and may facilitate concurrent access to I/O devices 820 and/or 822 by processor system 802 and/or programmable circuitry 804.

FIGS. 7 and 8 are provided for purposes of illustration and are not intended as limitations of the embodiments described herein. In one or more embodiments, the example architecture illustrated in FIG. 1 is implemented within an IC having an architecture the same as or similar to that described in connection with FIG. 7 or in FIG. 8.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise.

For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a system includes a hardware offload circuit and a slave processor coupled to the hardware offload circuit. The system also includes a processor coupled to the slave processor and configured to execute productivity language instructions. The processor, in response to executing the productivity language instructions, is configured to generate commands and provide the commands to the slave processor. The slave processor, in executing the commands, is configured to monitor operation of the hardware offload circuit and control operation of the hardware offload circuit.

In one aspect, the hardware offload circuit and the slave processor are synthesized and the slave processor is coupled to a sequencer of the hardware offload circuit.

In another aspect, the slave processor is configured to start and stop the hardware offload circuit.

In another aspect, the slave processor is configured to stop the hardware offload circuit in response to detecting a particular operating state of the hardware offload circuit, and the processor or the slave processor is configured to introspect a memory used by the hardware offload circuit.

In another aspect, the slave processor is configured to stop the hardware offload circuit in response to detecting the particular operating state in combination with detecting a particular state of another signal from a circuit other than the hardware offload circuit.

In another aspect, the processor or the slave processor is configured to compare data from the memory with expected data.

In another aspect, the memory is located within the hardware offload circuit.

In another aspect, the memory is an off-chip random-access memory accessible by the processor and the hardware offload circuit.

In another aspect, the slave processor is configured to generate an interrupt to the processor in response to detecting the particular operating state of the hardware offload circuit.

In another aspect, the slave processor includes a soft-processor and an instruction memory configured to receive the commands from the processor. The soft-processor retrieves the commands from the instruction memory for execution.

In another aspect, the slave processor further includes a data memory configured to receive data from the processor. The soft-processor is configured to retrieve the data from the data memory and write result data back to the data memory for retrieval by the processor.

In one or more embodiments, a method includes generating, by a processor and in response to execution of productivity language instructions, commands, providing the commands to a slave processor, and controlling operation of a hardware offload circuit by the slave processor executing the commands. Execution of selected ones of the commands causes the slave processor to generate controls signals for the hardware offload circuit.

In one aspect, the method includes implementing the hardware offload circuit and the slave processor within programmable circuitry of an integrated circuit.

In another aspect, the method includes synthesizing the hardware offload circuit and the slave processor and coupling the slave processor to a sequencer of the hardware offload circuit.

In another aspect, the method includes starting and stopping the hardware offload circuit using the control signals.

In another aspect, the method includes stopping the hardware offload circuit using the control signals and introspecting a memory used by the hardware offload circuit.

In another aspect, the method includes comparing a state of data of the hardware offload circuit from the introspecting with an expected state of the data.

In another aspect, the slave processor stops the hardware offload circuit in response to detecting a particular operating state of the hardware offload circuit.

In another aspect, the slave processor is configured to generate an interrupt to the processor in response to detecting the particular operating state of the hardware offload circuit.

In another aspect, the slave processor stops the hardware offload circuit in response to detecting the particular operating state and detecting a particular state of another signal from a circuit other than the hardware offload circuit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
    a hardware offload circuit implemented in programmable circuitry of a programmable integrated circuit;
    a slave processor implemented within the programmable integrated circuit and coupled to the hardware offload circuit; and
    a processor coupled to the slave processor and configured to execute productivity language instructions;
    wherein the processor, in response to executing the productivity language instructions, is configured to generate commands and provide the commands to the slave processor;
    wherein the processor is further configured to provide input data to the hardware offload circuit and receive result data from the hardware offload circuit from processing the input data; and
    wherein the slave processor, in executing the commands, is configured to monitor operation of the hardware offload circuit and control operation of the hardware offload circuit by, at least in part, stopping the hardware offload circuit in response to detecting a particular operating state of the hardware offload circuit.

2. The system of claim 1, wherein the slave processor is implemented in the programmable circuitry of the programmable integrated circuit and is coupled to a sequencer of the hardware offload circuit.

3. The system of claim 1, wherein the slave processor is further configured to start the hardware offload circuit.

4. The system of claim 1, wherein the processor or the slave processor is configured to introspect a memory used by the hardware offload circuit.

5. The system of claim 4, wherein the slave processor is configured to perform the stopping the hardware offload circuit in response to detecting the particular operating state in combination with detecting a particular state of another signal from a circuit other than the hardware offload circuit.

6. The system of claim 4, wherein the processor or the slave processor is configured to compare data from the memory with expected data.

7. The system of claim 4, wherein the memory is located within the hardware offload circuit.

8. The system of claim 4, wherein the memory is an off-chip random-access memory accessible by the processor and the hardware offload circuit.

9. The system of claim 4, wherein the slave processor is configured to generate an interrupt to the processor in response to detecting the particular operating state of the hardware offload circuit.

10. The system of claim 1, wherein the slave processor comprises:
    an instruction memory configured to store a binary specifying executable program code, wherein the binary is written to the instruction memory by the processor subsequent to implementation of the slave processor in programmable circuitry.

11. The system of claim 1, wherein the slave processor comprises:
    an instruction memory configured to receive the commands from the processor, wherein the slave processor retrieves the commands from the instruction memory for execution; and
    a data memory configured to receive the input data from the processor, wherein the slave processor is configured to retrieve the input data from the data memory and write the result data back to the data memory for retrieval by the processor.

12. A method, comprising:
    generating, by a processor and in response to execution of productivity language instructions, commands;
    providing the commands to a slave processor implemented within a programmable integrated circuit, wherein the slave processor is coupled to a hardware offload circuit implemented in programmable circuitry of the programmable integrated circuit;
    the processor providing input data to the hardware offload circuit and receiving result data from the hardware offload circuit from processing the input data; and
    controlling operation of the hardware offload circuit by the slave processor executing the commands, wherein the slave processor controls operation of the hardware offload circuit by, at least in part, stopping the hardware offload circuit in response to detecting a particular operating state of the hardware offload circuit.

13. The method of claim 12, further comprising:
    implementing the slave processor within the programmable circuitry of the programmable integrated circuit.

14. The method of claim 12, further comprising:
    synthesizing the hardware offload circuit and the slave processor and coupling the slave processor to a sequencer of the hardware offload circuit.

15. The method of claim 12, wherein executing selected ones of the commands causes the slave processor to generate controls signals for the hardware offload circuit, the method further comprising:
- performing the stopping the hardware offload circuit using the control signals.

16. The method of claim 12, wherein executing selected ones of the commands causes the slave processor to generate controls signals for the hardware offload circuit, the method further comprising:
- performing the stopping the hardware offload circuit using the control signals; and
- introspecting a memory used by the hardware offload circuit.

17. The method of claim 16, further comprising:
- comparing a state of data of the hardware offload circuit from the introspecting with an expected state of the data.

18. The method of claim 12, wherein executing selected ones of the commands causes the slave processor to generate controls signals for the hardware offload circuit, the method further comprising:
- starting the hardware offload circuit using the control signals.

19. The method of claim 18, wherein the slave processor is configured to generate an interrupt to the processor in response to detecting the particular operating state of the hardware offload circuit.

20. The method of claim 18, wherein slave processor stops the hardware offload circuit in response to detecting the particular operating state and detecting a particular state of another signal from a circuit other than the hardware offload circuit.

* * * * *